(12) United States Patent
Paillet et al.

(10) Patent No.: US 7,646,108 B2
(45) Date of Patent: Jan. 12, 2010

(54) MULTIPLE OUTPUT VOLTAGE REGULATOR

(75) Inventors: Fabrice Paillet, Hillsboro, OR (US);
Nick Triantafillou, Portland, OR (US);
Azam Barkatullah, San Jose, CA (US);
Daniel Elmhurst, Folsom, CA (US);
Peter Harrington, Folsom, CA (US);
Raymond W. Zeng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 11/537,046

(22) Filed: Sep. 29, 2006

(65) Prior Publication Data

US 2008/0080103 A1    Apr. 3, 2008

(51) Int. Cl.
*H02J 1/00* (2006.01)
*G05F 1/10* (2006.01)
*G05F 1/577* (2006.01)

(52) U.S. Cl. .................. 307/11; 323/266; 323/267; 323/271

(58) Field of Classification Search ................ 323/266, 323/267, 271; 307/11
See application file for complete search history.

(56) References Cited

U.S. PATENT DOCUMENTS

| 5,966,003 | A | * | 10/1999 | Takimoto et al. | 323/224 |
|---|---|---|---|---|---|
| 6,903,535 | B2 | * | 6/2005 | Liu et al. | 323/222 |
| 6,940,189 | B2 | * | 9/2005 | Gizara | 307/151 |
| 7,161,335 | B2 | * | 1/2007 | Wei et al. | 323/266 |
| 7,215,102 | B2 | * | 5/2007 | Harris et al. | 323/268 |
| 7,221,251 | B2 | * | 5/2007 | Menegoli et al. | 336/200 |
| 2006/0176031 | A1 | * | 8/2006 | Forman et al. | 323/267 |
| 2007/0194766 | A1 | * | 8/2007 | Ozawa et al. | 323/267 |

OTHER PUBLICATIONS 200710192948.1, "China Application serial No. 200710192948.1, Office Action mailed on Feb. 20, 2009", 19 pgs.

* cited by examiner

*Primary Examiner*—Albert W Paladini
*Assistant Examiner*—Hal I Kaplan
(74) *Attorney, Agent, or Firm*—Schwegman, Lundberg & Woessner, P.A.

(57) ABSTRACT

Some embodiments include a die having an output control circuit to interact with an output circuit to convert a source voltage into at least one output voltage. The die may also have a converter circuit to convert the output voltage into at least one additional output voltage.

31 Claims, 5 Drawing Sheets

MULTIPLE OUTPUT VOLTAGE REGULATOR

BACKGROUND

Electrical devices need power to operate. Some devices are designed to operate within a specified operating voltage range. Outside the specified voltage range, the device may operate improperly. In situations where the value of a source voltage is different from the value of the specified operating voltage range of the device, a voltage regulator or converter may be used to convert an available voltage into a specified voltage suitable for the device.

A conventional converter is usually formed on an integrated circuit (IC) package or chip. In some cases, multiple converters in separate IC packages may be used to convert a source voltage into multiple operating voltages to supply a single device or a group of devices. Using multiple converter IC packages to convert a source voltage into multiple operating voltages may be difficult due to space limitations, increased cost, or degraded device or system performance, or a combination of such factors.

DETAILED DESCRIPTION

Figure 1:
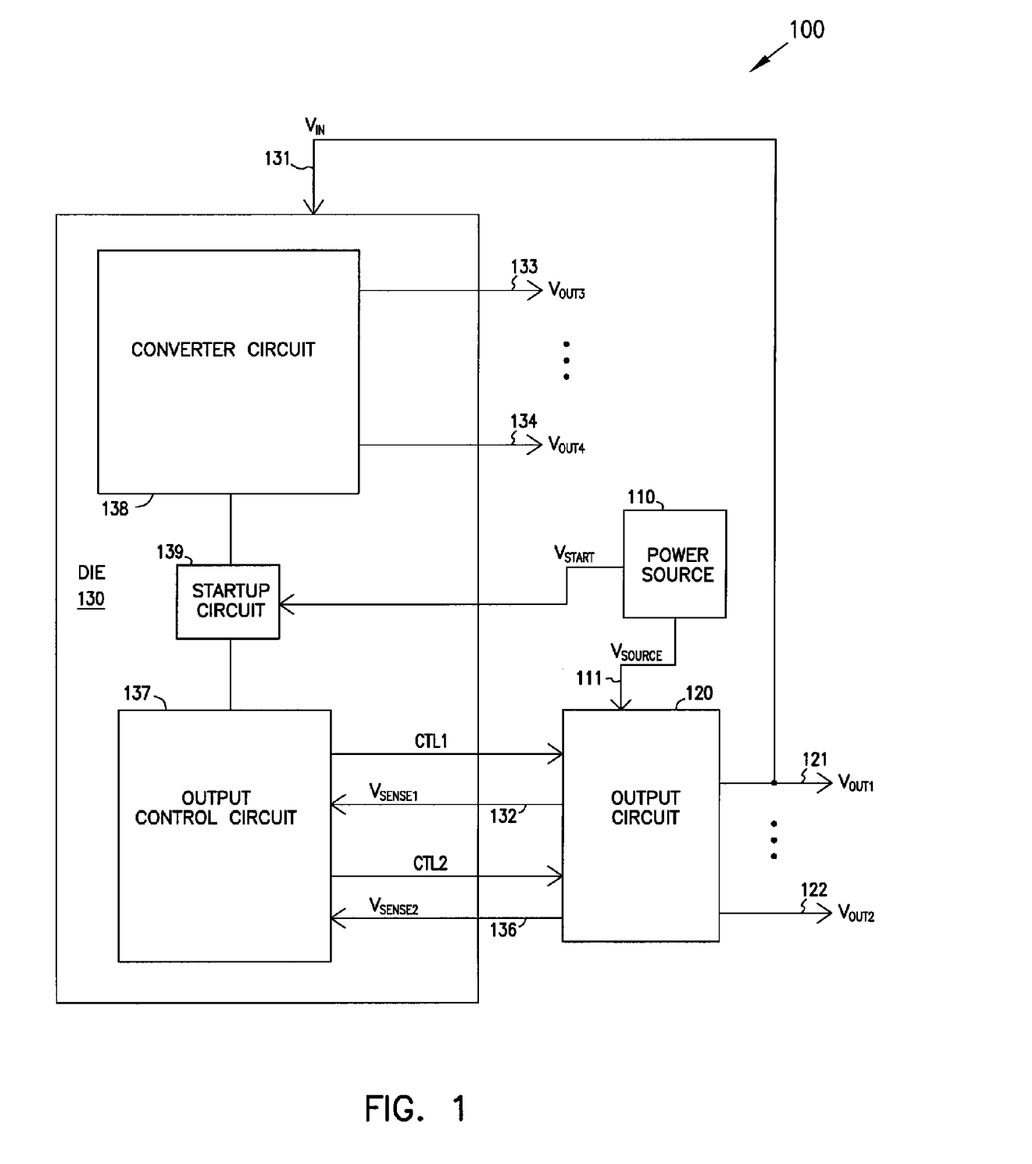
FIG. 1 shows an apparatus according to an embodiment of the invention.

FIG. 1 shows an apparatus 100 having a power source 110 to provide a source voltage $V_{SOURCE}$ at a source node 111 to an output circuit 120, and a startup voltage $V_{START}$ to a die 130. Power source 110 may include a battery or other sources. Die 130 may include a semiconductor die, e.g., a silicon die, on which an output control circuit 137 and a converter circuit 138 may be formed. In some embodiments, die 130 and output circuit 120 may be separate components. In other embodiments, output circuit 120 may be formed on die 130. In some embodiments, die 130 may be included in an IC package and output circuit 120 may be located outside the IC package. For example, output circuit 120 may be located on a circuit board. Apparatus 100 may reside in electronic devices or systems such as computers, cellular phones, personal digital assistants (PDAs), and others.

In FIG. 1, output control circuit 137 may combine or interact with output circuit 120 to form a first DC-DC (direct current to direct current) converter to convert $V_{SOURCE}$ into output voltages $V_{OUT1}$ and $V_{OUT2}$ at output nodes 121 and 122. At least one of $V_{OUT1}$ and $V_{OUT2}$ may be provided to die 130 as a supply voltage $V_{IN}$ at a supply node 131. Converter circuit 138 of die 130 may form a second DC-DC converter to convert at least one of $V_{IN}$ (which may be one of $V_{OUT1}$ and $V_{OUT2}$) into die output voltages $V_{OUT3}$ and $V_{OUT4}$ at die output nodes 133 and 134.

In some embodiments, $V_{OUT4}$ may be less than $V_{OUT3}$, each of $V_{OUT3}$ and $V_{OUT4}$ may less than each of $V_{OUT1}$ and $V_{OUT2}$, and $V_{SOURCE}$ may be greater than each of $V_{OUT1}$, $V_{OUT2}$, $V_{OUT3}$, and $V_{OUT4}$. In other embodiments, one or more of $V_{OUT3}$ and $V_{OUT4}$ may greater than on or more of $V_{OUT1}$ and $V_{OUT2}$, and $V_{SOURCE}$ may be less than one or more of $V_{OUT1}$, $V_{OUT2}$, $V_{OUT3}$, and $V_{OUT4}$.

As described above, one of the $V_{OUT1}$ and $V_{OUT2}$ may be provided to die 130 as the supply voltage $V_{IN}$. In some embodiments, before $V_{IN}$ is provided to die 130, a startup circuit 139 may be used by die 130 to receive $V_{START}$ to provide an initial supply voltage to output control circuit 137 and converter circuit 138 during a mode, such as a startup or reset mode, of apparatus 100. In some embodiments, when $V_{IN}$ is provided to die 130 from output circuit 120, die 130 may stop using $V_{START}$ and start using $V_{IN}$ as the supply voltage for its circuitry including output control circuit 137 and converter circuit 138.

Output control circuit 137 may respond to a sense voltage $V_{SENSE1}$, at a sense node 132 or connection 132. $V_{SENSE1}$, is related to $V_{OUT1}$ such that $V_{SENSE1}$ may carry feedback information of $V_{OUT1}$. For example, $V_{SENSE1}$ may be substantially equal to $V_{OUT1}$ or may be proportional to $V_{OUT1}$. In some embodiments, at least a portion of connection 132 may be outside die 130 and outside output circuit 120. For example at least a portion of connection 132 may be a conductive trace on a circuit board where die 130 may output circuit 120 may reside. In FIG. 1, based on $V_{SENSE1}$ on sense node or connection 132, output control circuit 137 may control $V_{OUT}$ using a control signal CTL1. Output control circuit 137 may control $V_{OUT}$, by keeping $V_{OUT}$, at a substantially constant voltage value or at a voltage value within a voltage range.

In some embodiments, the voltage value of $V_{OUT1}$ may be determined by the product of the duty cycle of CTL1 and the voltage value of $V_{SOURCE}$. In some embodiments, CTL1 may be a periodic signal having frequency. The duty cycle of CTL1 may be and the ratio of the on-time over the cycle time (the inverse of the frequency) of CTL1. Within each cycle of CTL1, the on-time of CTL1 may correspond to a time interval when CTL1 has a high signal level, and the off-time interval of CTL1 may correspond to a time interval when CTL1 has a low signal level.

As shown in FIG. 1, output control circuit 137 may also respond to a sense voltage $V_{SENSE2}$ at a sense node or connection 136 to control $V_{OUT2}$ using the control signal CTL2. $V_{SENSE2}$ is related to $V_{OUT2}$ such that $V_{SENSE2}$ may carry feedback information of $V_{OUT2}$. Similarly to the control of $V_{OUT1}$, output control circuit 137 may control $V_{OUT2}$ by keeping $V_{OUT2}$ at a substantially constant voltage value or at a voltage value within a voltage range. In some embodiments, the voltage value of $V_{OUT2}$ may be determined by the product of duty cycle of CTL2 and the voltage value of $V_{SOURCE}$.

In some embodiments, output control circuit 137 may include a signal generator, such as pulse width modulation (PWM) circuitry or other type of circuitry, to provide CTL1 and CTL2 with duty cycles such that the voltage value of $V_{OUT1}$ and $V_{OUT2}$ may be determined by the duty cycle of CTL1 or CTL2 and $V_{SOURCE}$, as described above.

In FIG. 1, output control circuit 137 may operate at first frequency, and converter circuit 138 may operate at a second frequency different from the first frequency. In some embodiments, the first frequency may be lower than the second frequency. For example, output control circuit 137 may operate at a frequency lower than ten mega Hertz (MHz), and converter circuit 138 may operate at a frequency greater than ten mega Hertz (MHz). In another example, output control circuit 137 may operate at a frequency of about 300 kilo Hertz (KHz), and converter circuit 138 may operate at a frequency of about 100 MHz.

FIG. 1 shows an example embodiment of apparatus 100 where output circuit 120 receives $V_{SOURCE}$ to generate two output voltages (e.g., $V_{OUT1}$ and $V_{OUT2}$). In some embodiments, output circuit 120 may generate fewer or greater than two output voltages. FIG. 1 also shows an example embodiment of apparatus 100 where die 130 receives one output voltage (e.g., $V_{OUT1}$) from output circuit 120 to generate two die output voltages (e.g., $V_{OUT3}$ and $V_{OUT4}$). In some embodiments, die 130 may receive more than one output voltages from output circuit 120 to generate fewer or greater than two die output voltages.

Figure 2:
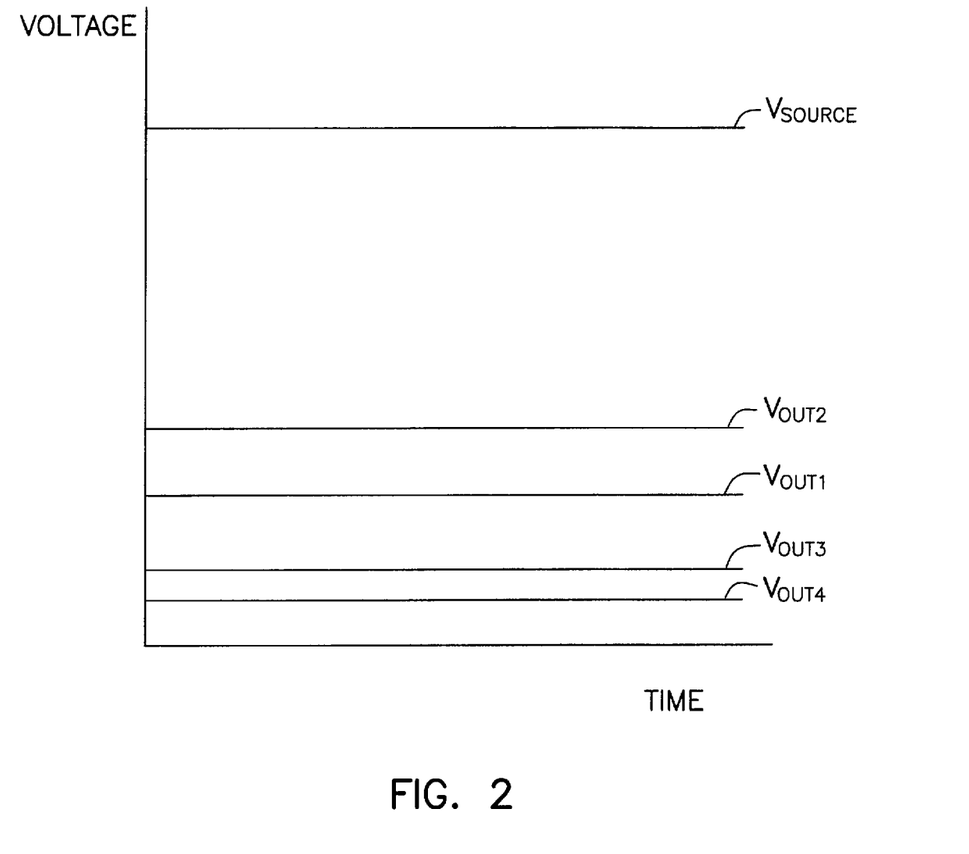
FIG. 2 is an example timing diagram of various signals for FIG. 1.

FIG. 2 shows an example timing diagram of various signals for FIG. 1. As shown in FIG. 2, $V_{OUT4}$ may be less than $V_{OUT3}$, each of $V_{OUT3}$ and $V_{OUT4}$ may less than each of $V_{OUT1}$ and $V_{OUT2}$, and $V_{SOURCE}$ may be greater than each of $V_{OUT1}$, $V_{OUT2}$, $V_{OUT3}$, and $V_{OUT4}$.

In some embodiments, $V_{SOURCE}$ may have range of about 8 volts to about 20 volts, $V_{OUT1}$ may be about 3.3 volts, $V_{OUT2}$ may be about five volts, $V_{OUT3}$ may be in a range of about 1.5 volts to about 1.8 volts, and $V_{OUT4}$ may be in a range of about 0.35 volt to about 1.05 volts. In other embodiments, the voltage values of FIG. 2 may vary.

Figure 3:
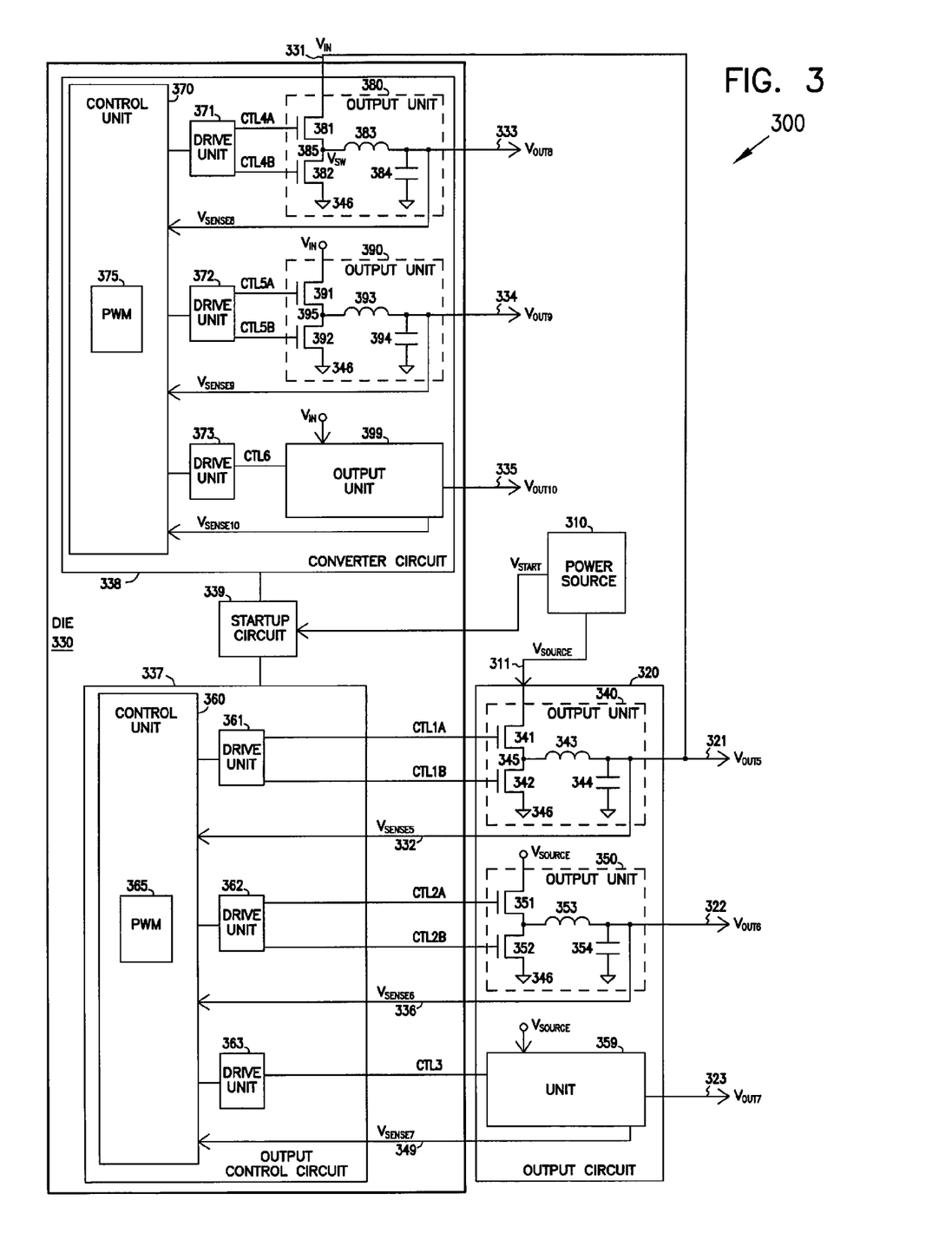
FIG. 3 shows an apparatus with a die to generate multiple die output voltages according to an embodiment of the invention.

FIG. 3 shows an apparatus 300 having a power source 310 to provide a source voltage $V_{SOURCE}$ at a source node 311 to an output circuit 320, and a startup voltage $V_{START}$ to a die 330. In some embodiments, one or more portions of apparatus 300 may be used in apparatus 100 of FIG. 1 and one or more portions of apparatus 100 may be used in apparatus 300 of FIG. 3. Control signals CTL1A and CTL1B of FIG. 3 may collectively represent control signal CTL1 of FIG. 1. Control signals CTL2A and CTL2B of FIG. 3 may collectively represent control signal CTL2 of FIG. 1.

In FIG. 3, die 330 includes an output control circuit 337 and a converter circuit 338 formed on die 330. Output control circuit 337 may combine or interact with output circuit 320 to form a first DC-DC converter to convert $V_{SOURCE}$ into output voltages $V_{OUT5}$, $V_{OUT6}$, and $V_{OUT7}$ at output nodes 321, 322, and 323. At least one of $V_{OUT5}$, $V_{OUT6}$, and $V_{OUT7}$ may be provided to die 330 as a supply voltage $V_{IN}$ at a supply node 331. Converter circuit 338 of die 330 may form a second DC-DC converter to convert $V_{IN}$ (which may be one of $V_{OUT5}$, $V_{OUT6}$, and $V_{OUT7}$) into die output voltages $V_{OUT8}$, $V_{OUT9}$, and $V_{OUT10}$ at die output nodes 333, 334, and 335.

As described above, one of $V_{OUT5}$, $V_{OUT6}$, $V_{OUT7}$ (e.g., $V_{OUT5}$) may be provided to die 330 as the supply voltage $V_{IN}$. In some embodiments, before $V_{IN}$ is provided to die 330, a startup circuit 339 may be used by die 330 to receive $V_{START}$ to provide an initial supply voltage to output control circuit 337 and converter circuit 338 during a mode, such as a startup or reset mode, of apparatus 300.

As shown in FIG. 3, output circuit 320 includes units 340, 350, and 359 to receive $V_{SOURCE}$ and generate output voltages $V_{OUT5}$, $V_{OUT6}$, and $V_{OUT7}$. $V_{OUT5}$, $V_{OUT6}$, and $V_{OUT7}$ may have different voltage values.

Output unit 340 of output circuit 320 includes transistors 341 and 342, an inductor 343, and a capacitor 344 to generate $V_{OUT5}$. Control signals CTL1A and CTL1B may be used to selectively turn on and off transistors 341 and 342 such that node 345 may be either coupled to source node 311 and decoupled from a supply node 346 (e.g., ground) or decoupled from source node 311 and coupled to supply node 346. For example, transistor 341 may be selectively turned on and transistor 342 may be selectively turned off to couple node 345 to source node 311 and decoupled node 345 from supply node 346. In another example, transistor 341 may be selectively turned off and transistor 342 may be selectively turned on to decouple node 345 from source node 311 and couple node 345 to supply node 346. Transistors 341 and 342 may be turned on and off based on the frequencies of the CTL1A and CTL1B signals such that node 345 may have many switching cycles. The switching cycles at node 345 may correspond to the frequency of the CTL1A or CTL1B. In some embodiments, CTL1A and CTL1B may have the same frequency but may have opposite phase (e.g., 180 degrees out of phase). In other embodiments, CTL1A and CTL1B may be complementary signals.

Selectively turning on and off transistors 341 and 342 using CTL1A and CTL1B and the action of L-C network (formed by inductor 343 and capacitor 344) may convert $V_{SOURCE}$ into $V_{OUT5}$. When transistors 341 and 342 are selectively turned on and off, inductor 343 and capacitor 344 may go through an energizing interval and de-energizing interval in each cycle of CTL1A or CTL1B. The energizing interval may happen during each time node 345 is coupled to source node 311 and decoupled from supply node 346. The de-energizing interval may happen during each time node 345 is decoupled from source node 311 and coupled to supply node 346. During the energizing interval, voltage from source node 311 may be transferred to node 345. During the de-energizing interval, the transfer of voltage from source node 311 to node 345 may be suspended and the voltage from node 345 may be transferred to output node 321 as $V_{OUT5}$. The voltage value of $V_{OUT5}$ may be determined by the duty cycle of CTL1A or CTL1B and $V_{SOURCE}$.

$V_{OUT6}$ and $V_{OUT7}$ may be generated in a similar fashion by units 350 and 359 of output circuit 320. For example, output unit 350 may include transistors 351 and 352, an inductor 353, and a capacitor 354 to generate $V_{OUT6}$ based on $V_{SOURCE}$. The value of $V_{OUT6}$ may be determined by the duty cycle of CTL2A or CTL2B and $V_{SOURCE}$. In some embodiments, CTL2A and CTL2B may have the same frequency but may have opposite phase. Output unit 359 may use control signal CTL3 and $V_{SOURCE}$ to generate $V_{OUT7}$. The value of $V_{OUT7}$ may be determined by duty cycle of CTL3 and $V_{SOURCE}$.

$V_{SENSE5}$, $V_{SENSE6}$, and $V_{SENSE7}$ at sense nodes or connections 332, 336, and 349 may provide feedback information of $V_{OUT5}$, $V_{OUT6}$, and $V_{OUT7}$, respectively, to die 330. In some embodiments, based on $V_{SENSE5}$, $V_{SENSE6}$, and $V_{SENSE7}$, die 330 may control $V_{OUT5}$, $V_{OUT6}$, and $V_{OUT7}$, for example, by keeping $V_{OUT5}$, $V_{OUT6}$, and $V_{OUT7}$ within their voltage ranges. In some embodiments, die 330 may change the timing of the CTL1A, CTL1B, CTL2A, CTL2B, or CTL3, based on $V_{SENSE5}$, $V_{SENSE6}$, and $V_{SENSE7}$, to control $V_{OUT5}$, $V_{OUT6}$, or $V_{OUT7}$. For example, when $V_{SENSE5}$ is at a value indicating that $V_{OUT5}$ may be at or outside a lower limit of the voltage range of $V_{OUT5}$, die 330 may activate CTL1A sooner (in comparison with when $V_{OUT5}$ is within the voltage range) so that transistor 341 may be turned on sooner to increase the voltage value of $V_{OUT5}$ to keep $V_{OUT5}$ within its voltage range. Die 330 may use $V_{SENSE6}$ and $V_{SENSE7}$ in a similar fashion to control $V_{OUT6}$ and $V_{OUT7}$.

In some embodiments, two or more of the inductors of output circuit 320 (e.g., inductors 343 and 353) may be arranged such that at least one portion of output circuit 320 may be part of a multi-phase converter arrangement. For example, in a multi-phase converter arrangement in some embodiments, output nodes 321 and 322 may be the same output node (i.e., tied together), one of the capacitors 344 and 354 and one of the $V_{SENSE5}$ and $V_{SENSE6}$ may be omitted. In other embodiments, the inductors of output circuit 320 (e.g., inductors 343 and 353) may form transformer structures.

Output control circuit 337 includes a control unit 360 and drive units 361, 362 and 363. Drive units 361, 362 and 363 may include circuitry, e.g., buffers, to appropriately drive CTL1A, CTL1B, CTL2A, CTL2B, and CTL3. In some embodiments, control unit 360 may include PWM circuitry 365 to generate CTL1A, CTL1B, CTL2A, CTL2B, and CTL3. In some embodiments, control unit 360 may include a comparator circuitry to compare each of $V_{SENSE5}$, $V_{SENSE6}$, and $V_{SENSE7}$ with one or more known voltages to keep $V_{OUT5}$, $V_{OUT6}$, and $V_{OUT7}$ within their voltage ranges.

Converter circuit 338 includes a control unit 370 and drive units 371, 372 and 373 to provide CTL4A, CTL4B, CTL5A, CTL5B, and CTL6 to corresponding output units 380, 390, and 399. Drive units 371, 372 and 373 may include circuitry, e.g., buffers, to appropriately drive CTL4A, CTL4B, CTL5A, CTL5B, and CTL6. Converter circuit 338 may include PWM circuitry 375 to generate CTL4A, CTL4B, CTL5A, CTL5B, and CTL6. Control unit 370 may receive $V_{SENSE8}$, $V_{SENSE9}$, and $V_{SENSE10}$, which may carry feedback information of $V_{OUT8}$, $V_{OUT9}$, and $V_{OUT10}$, respectively. In some embodiments, converter circuit 338 and the combination of output control circuit 337 and output circuit 320 may operate similar fashions.

In FIG. 3, control unit 370 may control a transfer of $V_{IN}$ from supply node 331 to a switch node 385 of output unit 380. $V_{SW}$ may be a switch voltage representing the voltage at switch node 385. Output unit 380 includes transistors 381 and 382, an inductor 383, and a capacitor 384. In some embodiments, inductor 383 may be an integrated inductor that is formed on die 330. In other embodiments, inductor 383 may be a discrete or air core inductor that is separated from die 330. For example, inductor 383 may be a discrete inductor formed on a package substrate of an IC package on which die 330 resides.

In some embodiments, control unit 370 controls the transfer of power from supply node 331 to switch node 385 by controlling the switching cycles a switch node 385. The switching cycles at switch node 385 may correspond to the frequency of the CTL4A or CTL4B. In some embodiments, CTL4A and CLT4B may be periodic signals with the same frequency but may have opposite phase. Each switching cycle at switch node 385 may include an energizing interval and a de-energizing interval. During the energizing interval, control unit 370 may couple switch node 385 to supply node 331 through transistor 381 to transfer power from supply node 331 to switch node 385. During the de-energizing interval, control unit supply 370 may decouple switch node 385 from supply node 331 to suspend the transfer of power from supply node 331 to switch node 385 and transfer power from switch node 385 to die output node 333. By coupling switch node 385 to and decoupling switch node 385 from supply node 331 in each switching cycle using CLT4A and CTL4B, control unit 370 may generate $V_{OUT8}$ based on $V_{IN}$ and the duty cycle of CTL4A or CTL4B. Switch node 385 may be coupled to supply node 331 through transistor 381 when transistor 381 is turned on, and decoupled from supply node 331 when transistor 381 is turned off. Switch node 385 is coupled to supply node 346 through transistor 382 when transistor 382 is turned on, and decoupled from supply node 346 when transistor 382 is turned off.

Control unit 370 may be configured such that it may provide CTL4A and CTL4B in a fashion that only one of the transistors 381 and 382 may be turned on at a time. In some embodiments, control unit 370 may be configured such that it may provide CTL4A and CTL4B in a fashion that may turn off both transistors 381 and 382 before it turns on one of the transistors (e.g., either 381 or 382) to avoid contention at switch node 385.

In some embodiments, control unit 370 may include a comparator with a switching hysterisis control circuitry such that control unit 370 maintains the states (on state or off state) of transistors 381 and 382 when $V_{SENSE8}$ indicates that the voltage value of $V_{OUT8}$ is within the voltage range of $V_{OUT8}$. In the embodiments with the switching hysterisis control circuitry, control unit 370 may change the states of transistors 381 and 382 only when $V_{SENSE8}$ reaches the lower voltage value of the voltage range of $V_{OUT8}$ or the upper voltage value of the voltage range of the voltage range of $V_{OUT8}$. For example, control unit 370 may turn on transistor 381 when $V_{SENSE8}$ reaches the lower voltage value of the voltage range of $V_{OUT8}$ and turn on transistor 382 when $V_{SENSE8}$ reaches the upper voltage value of the voltage range of $V_{OUT8}$.

Output units 390 and 399 may generate $V_{OUT9}$ and $V_{OUT10}$ in a fashion similar to that of output unit 380. For example, output unit 390 may include transistors 391 and 392, a switch node 395, an inductor 393, and a capacitor 394 to generate $V_{OUT9}$. Control signals CTL5A and CTL5B may be used by output unit 390 to turn on and off transistor 391 and 392. Control signal CTL6 may be used by output unit 399. Output units 390 and 399 may also use $V_{SENSE9}$ and $V_{SENSE10}$ to control $V_{OUT9}$ and $V_{OUT10}$ in a fashion similar to that of output unit 380.

In some embodiments, two or more of the inductors of converter circuit 338 (e.g., inductors 383 and 393) may be arranged such that at least one portion of converter circuit 338 may include a multi-phase converter arrangement. For example, in a multi-phase converter arrangement in some embodiments, output nodes 333 and 334 may be the same die output node (i.e., tied together), one of the capacitors 384 and 394 and one of the $V_{SENSE8}$ and $V_{SENSE9}$ may be omitted. In these embodiments, drive units 371 and 372, and output units 380 and 390 may form a part of the multi-phase converter arrangement to drive the voltage signal at the die output node of the multi-phase converter arrangement. In other embodiments, the inductors of converter circuit 338 (e.g., inductors 383 and 393) may form transformer structures.

In some embodiments, output control circuit 337 and converter circuit 338 may be configured to operate at different frequencies. For example, output control circuit 337 and converter circuit 338 may be configured to operate at different frequency such that each of CTL4A, CTL4B, CTL5A, CTL5B, and CTL6 may have a higher frequency than each of CTL1A, CTL1B, CTL2A, CTL2B, and CTL3. Thus, in some embodiments, converter circuit 338 may switch transistors (e.g., transistors 381, 382, 391, and 392) at a higher frequency than output control circuit 337 switching transistors (e.g., transistors 341, 342, 351, and 352) of output circuit 320. Thus, in some embodiments, apparatus 300 may include a hybrid converter having both a relatively high-frequency or high-speed switching converter (e.g., converter circuit 338) and a relatively low-frequency or low-speed switching controller (e.g., output control circuit 337) to convert a voltage source (e.g., $V_{SOURCE}$) into multiple output voltages (e.g., $V_{OUT5}$ through $V_{OUT10}$).

In some situations, a source voltage such as $V_{SOURCE}$ may be relatively high such that high-speed conventional converters may be unable to convert the source voltage into multiple output voltages because of high-voltage limitation. For example, some circuit elements, such as on-die switching transistors on the dice of the conventional converters, may be unable to withstand the high voltage of the source voltage, thereby limiting the value of the source voltage that conventional high-speed converters may use. In other situations, multiple separate low-speed conventional converters may be used to convert a high voltage source into multiple output supply voltages. Multiple separate low-speed conventional converters may occupy more space on a circuit board. Therefore, the use of multiple separate low-speed conventional converters may be limited by board space.

Apparatus 300, however, may overcome both the high-voltage limitation of high-speed integrated converters and space limitation of low-speed conventional converters. For example, the low-speed switching of output control circuit 337 of die 330 of FIG. 3 may allow apparatus 300 to overcome the high-voltage limitation of conventional high-speed converters. The high-speed converter circuit 338 of die 330 of FIG. 3 with multiple output voltages being generated from the same die may allow apparatus 300 to overcome the space limitation of conventional low-speed switching converters. Therefore, apparatus 300, with a hybrid converter formed on a single die or chip (e.g., die 330) may allow saving of board space, reduction in cost, or improvement of system performance, or a combination of such factors.

Figure 4:
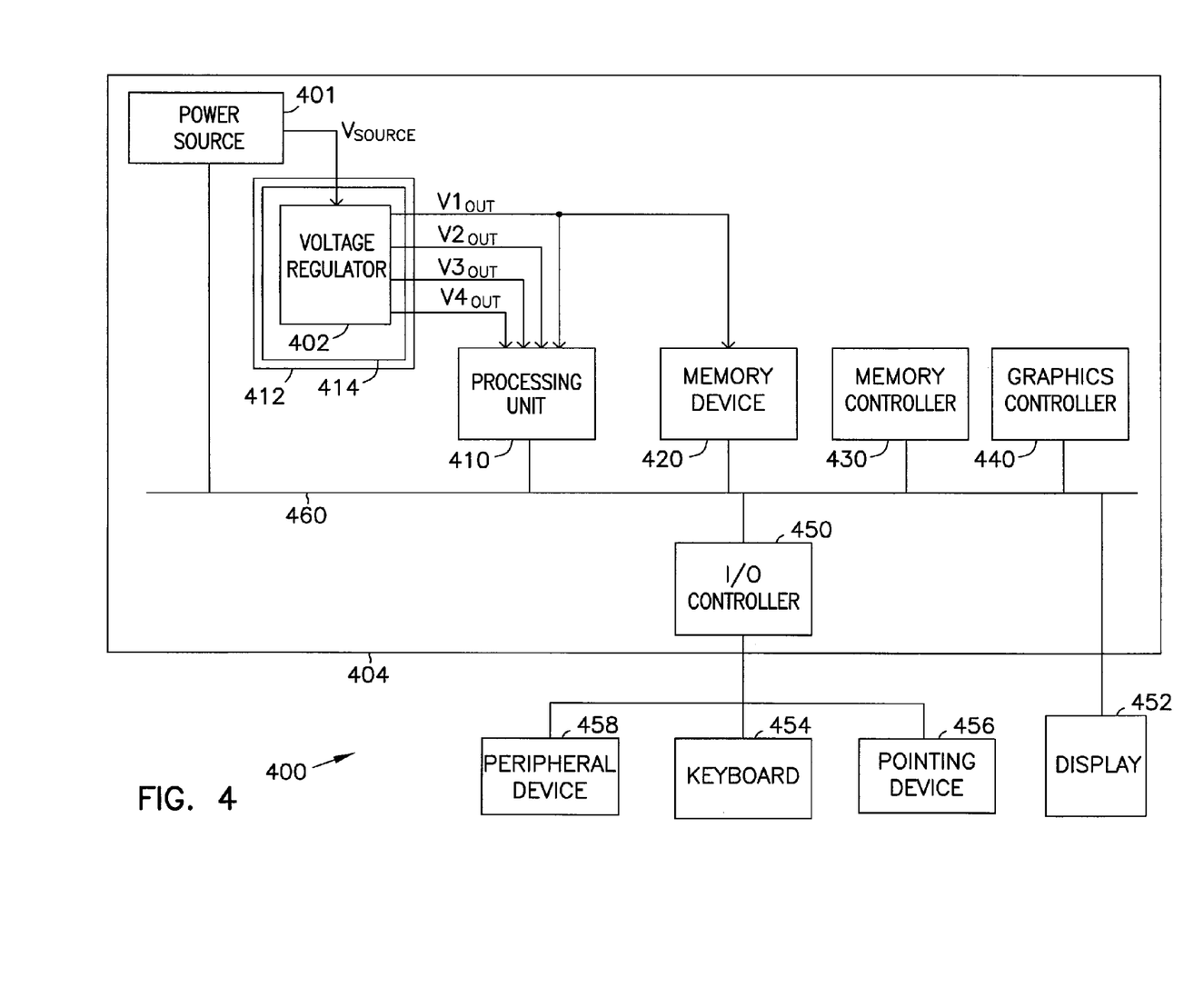
FIG. 4 shows a system according to an embodiment of the invention.

FIG. 4 shows an embodiment of a system 400 including a power source 401 to provide a source voltage $V_{SOURCE}$, a voltage regulator 402 to receive $V_{SOURCE}$ and provide output voltages $V1_{OUT}$, $V2_{OUT}$, $V3_{OUT}$, and $V4_{OUT}$. System 400 may also include a processing unit 410, a memory device 420, a memory controller 430, a graphics controller 440, an input and output (I/O) controller 450, a display 452, a keyboard 454, a pointing device 456, a peripheral device 458, and a bus 460. System 400 may further include a circuit board 404 on which some components of system 400 are located. FIG. 4 shows an example where $V1_{OUT}$, $V2_{OUT}$, $V3_{OUT}$, and $V4_{OUT}$ are provided to processing unit 410, and $V1_{OUT}$ is provided to memory device 420. In some embodiments, different combination of $V1_{OUT}$, $V2_{OUT}$, $V3_{OUT}$, and $V4_{OUT}$ may be provided to processing unit 410 and memory device 420. In other embodiments, $V1_{OUT}$, $V2_{OUT}$, $V3_{OUT}$, and $V4_{OUT}$ may also be provided to other components of system 400.

In some embodiments, $V1_{OUT}$ or $V2_{OUT}$ may correspond to at least one of $V_{OUT1}$ and $V_{OUT2}$ of FIG. 1 or at least one of $V_{OUT5}$, $V_{OUT6}$, $V_{OUT7}$ of FIG. 3. $V3_{OUT}$ or $V4_{OUT}$ of FIG. 4 may correspond to at least one of $V_{OUT3}$ and $V_{OUT4}$ of FIG. 1 or at least one of $V_{OUT8}$ through $V_{OUT10}$ of FIG. 3.

In FIG. 4, power source 401 may be provided by an alternating current to direct current (AC to DC) converting circuitry, a battery, or others. Memory device 420 may be a volatile memory device, a non-volatile memory device, or a combination of both. For example, memory device 420 may be a dynamic random access memory (DRAM) device, a static random access memory (SRAM) device, a flash memory device, or a combination of these memory devices. I/O controller 450 may include a communication module for wired or wireless communication.

Processing unit 410 may process data transferred to and from other components via bus 460. Processing unit 410 may include a general-purpose processor or an application specific integrated circuit (ASIC). Processing unit 410 may be a single core processing unit or a multiple-core processing unit.

FIG. 4 shows an example where voltage regulator 402 may be included in a single component, for example, voltage regulator 402 may be included in an IC package 412. IC package 412 may include a package substrate 414 coupled to a die (e.g., die 130 of FIG. 1 or die 330 of FIG. 3) on which at least a portion of voltage regulator 402 may be formed on the die. In some embodiments, voltage regulator 402 may be separate multiple components. For example, a portion of voltage regulator 402 may be formed on a die (e.g., die 130 of FIG. 1 or die 330 of FIG. 3) in IC package 412 and the rest of voltage regulator 402 (e.g., output circuit 120) may be outside the die and on circuit board 404. In another example, a portion of voltage regulator 402 may be formed on a die (e.g., die 130 of FIG. 1 or die 330 of FIG. 3) and one or more inductors and capacitors of voltage regulator 402 (e.g., one or more of inductors 383 and 393 and capacitors 384 and 394 of FIG. 3) may be formed on a portion of package substrate 414.

In some embodiments, voltage regulator 402 may include an embodiment of apparatus 100 of FIG. 1 or apparatus 300 of FIG. 3. Thus, in some embodiments, voltage regulator 402 may include an output circuit, and a die with an output control circuit and a converter circuit such as those of apparatus 100 of FIG. 1 or apparatus 300 of FIG. 3. The output control circuit of voltage regulator 402 may operate at a frequency lower than a frequency of the converter circuit.

Since voltage regulator 402 may include an embodiment of apparatus 100 or apparatus 300, voltage regulator 402 may include a hybrid voltage regulator with both a high-speed converter and a low-speed output control circuit in a single die, such as those described in FIG. 1 and FIG. 3. Thus, voltage regulator 402 may be compact, thereby it may reduce cost of system 400, or save space on circuit board 404 of system 400, or both. Voltage regulator 402 may also improve power management for system 400. For example, since a least a portion of voltage regulator 402 (e.g. a converter circuit on the die of voltage regulator 402) may operate at a relatively higher frequency, output voltage such as $V3_{OUT}$ and $V4_{OUT}$ may be changed or generated in a relatively short time to accommodate other components of system 400 such as processing unit 410. For example, $V3_{OUT}$ or $V4_{OUT}$ may be changed from a power saving level or standby level to an active level in the order of nanoseconds to quickly provide a supply voltage to processing unit 410 or other components of system 400.

System 400 may include computers (e.g., desktops, laptops, hand-helds, servers, Web appliances, routers, etc.), wireless communication devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Figure 5:
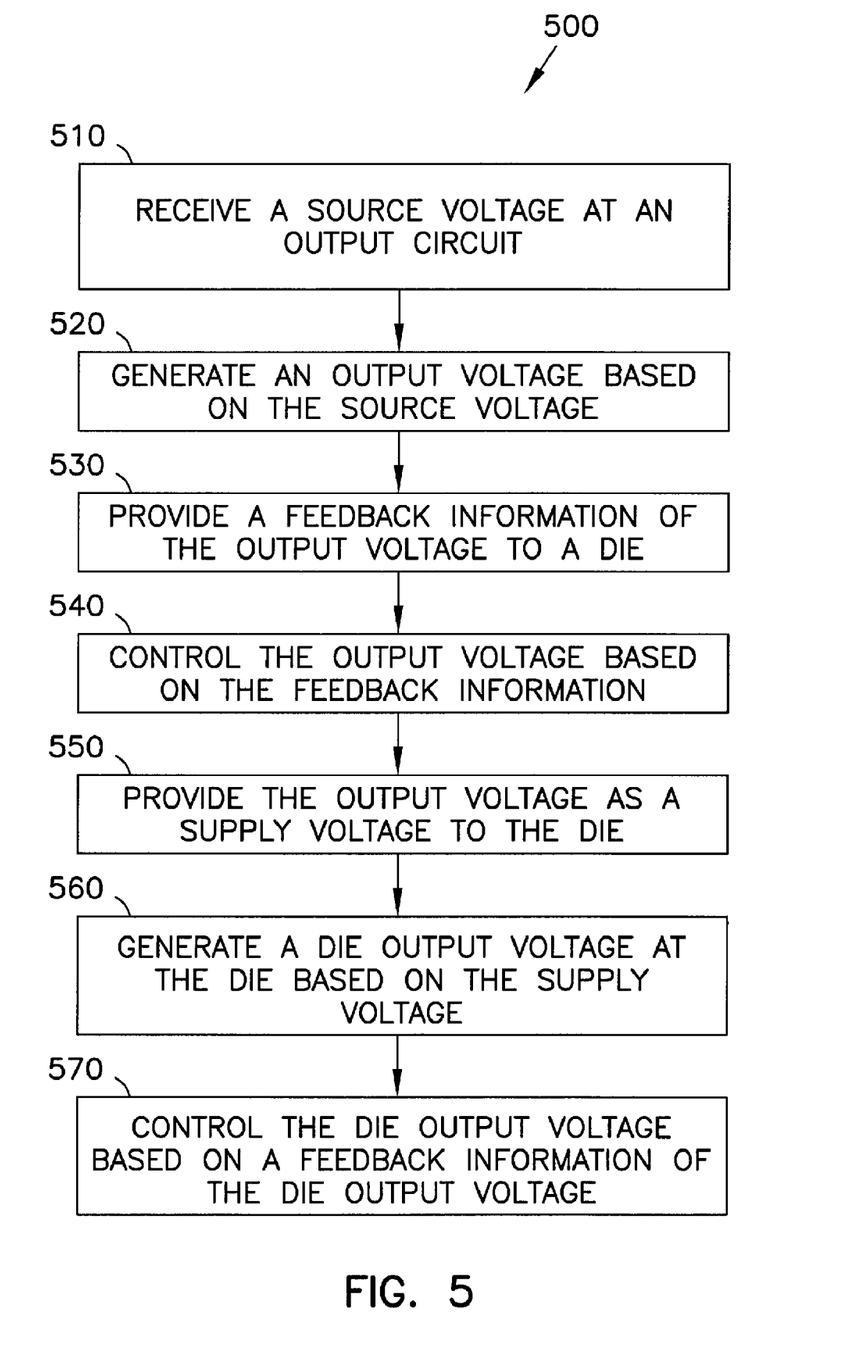
FIG. 5 is a flowchart showing a method according to an embodiment of the invention.

FIG. 5 is a flowchart showing an embodiment of a method 500. Method 500 may be used in apparatus 100 of FIG. 1, apparatus 300 of FIG. 3, and system 400 of FIG. 4. Thus, the circuit elements used in method 500 may include the circuit elements of the embodiments of apparatus 100, apparatus 300, and system 400, as described above with reference to FIG. 1 through FIG. 4.

In method 500 of FIG. 5, activity 510 receives a source voltage at an output circuit. Activity 520 generates an output voltage based on the source voltage. Activity 530 provides a feedback information of the output voltage to a die. Activity 540 controls the output voltage based on the feedback information of the output voltage. Activity 550 provides the output voltage as a supply voltage to a supply node of the die. Activity 560 generates at a terminal of an inductor a die output voltage based on the supply voltage. Activity 570 controls the die output voltage based on a feedback information of the die output voltage.

The individual activities of method 500 do not have to be performed in the order shown or in any particular order. Some activities may be repeated, and others may occur only once. Various embodiments may have more or fewer activities than those shown in FIG. 5. For example, in some embodiments, method 500 may include the activities or operations of apparatus 100, apparatus 300, and system 400, as described above with reference to FIG. 1 through FIG. 4.

The above description and the drawings illustrate some embodiments of the invention to enable those skilled in the art to practice the embodiments of the inventions. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is determined by the appended claims, along with the full range of equivalents to which such claims are entitled.

The Abstract is provided to comply with 37 C.F.R. § 1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. An apparatus comprising:
a die including a first sense node to receive a first sense voltage related to a first output voltage at a first output node of an output circuit, a first supply node on the die to receive the first output voltage, a first die output node on the die to provide a first die output voltage having a first voltage value, and a second die output node on the die to provide a second die output voltage having a second voltage value different from the first voltage value;
an output control circuit located on the die to interact with the output circuit and responsive to the first sense voltage to convert a source voltage into the first output voltage at the first output node of the output circuit, the die further including a node to receive a voltage different from the source voltage to provide an initial voltage to the output control circuit; and
a converter circuit located on the die to convert the first output voltage at the first supply node into the first die output voltage at the first die output node.

2. The apparatus of claim 1, wherein the output control circuit is to operate at a first frequency, and wherein the converter circuit is configured to operate at a second frequency higher than the first frequency.

3. The apparatus of claim 1, wherein the first sense node is to couple to a terminal of an inductor of the output circuit.

4. The apparatus of claim 1, wherein the die further includes a first switch node to couple to a first terminal of an inductor, and wherein the first die output node is to couple to a second terminal of the inductor.

5. The apparatus of claim 4, wherein the first die output node is further to couple to a terminal of a capacitor.

6. The apparatus of claim 4, wherein the inductor is formed on the die.

7. The apparatus of claim 4, wherein the die is coupled to a package substrate, and wherein the inductor is formed on a portion of the package substrate.

8. The apparatus of claim 4, wherein the inductor includes an air core inductor.

9. The apparatus of claim 4, wherein the die further includes a second switch node to couple to a first terminal of a second inductor, and wherein the second die output node is to couple to a second terminal of the second inductor.

10. The apparatus of claim 4, wherein the converter circuit includes:
a first transistor coupled between the first switch node and the first supply node; and
a second transistor coupled between the first switch node and a second supply node.

11. The apparatus of claim 9, wherein the converter circuit further includes pulse width modulation circuitry to provide at least one control signal to control a switching of the first and second transistors based on the duty cycle of the control signal.

12. The apparatus of claim 1, wherein the die further includes a first switch node to couple to a first terminal of a first inductor, and wherein the first die output node is to a second terminal of the first inductor, and wherein the die further includes a second switch node to couple to a first terminal of a second inductor, and wherein the second die output node is to couple to a second terminal of the second inductor.

13. The apparatus of claim 1, wherein the die further includes a second sense node to receive a second sense voltage related to the second output voltage at the second output node of the output circuit.

14. A system comprising:
an output circuit including a node to receive source voltage, and a first output node to provide a first output voltage;
a die including a first sense node to receive a first sense voltage related to the first output voltage, a first supply node to receive the first output voltage, a first die output node to provide a first die output voltage having a first voltage value, and a second die output node to provide a second die output voltage having a second voltage value different from the first voltage value;
an output control circuit located on the die to interact with the output circuit and responsive to the first sense voltage to convert the source voltage into the first output voltage at the first output node of the output circuit, the die further including a node to receive a voltage different from the source voltage to provide an initial voltage to the output control circuit;
a converter circuit located on the die to convert the first output voltage from the first supply node into the first die output voltage at the first die output node; and
a random access memory device to receive one of the first output voltage and the first die output voltage.

15. The system of claim 14, wherein the converter circuit includes:
a transistor coupled between the first supply node and a switch node;
an inductor coupled between the switch node and the first die output node; and
a capacitor coupled between the first die output node and a second supply node.

16. The system of claim 14, wherein the output circuit includes:
a transistor coupled between the source node and a first node;
an inductor coupled between the first node and the first output node; and
a capacitor coupled between the first output node and a second supply node.

17. The system of claim 16, wherein the output circuit further includes:
a second transistor coupled between the source node and a second node; and
a second inductor coupled between the second node and a second output node.

18. The system of claim 16, wherein the first sense node is coupled to the inductor of the output circuit via a connection, wherein at least a portion of the connection is located outside the die and outside the output circuit.

19. A method comprising:
receiving a source voltage at an output circuit;
generating a first output voltage based on the source voltage;
providing a feedback information of the first output voltage to a die;
controlling the first output voltage based on the feedback information of the first output voltage, the controlling being performed by an output control circuit;
providing an initial voltage to the output control circuit, the initial voltage being different from the source voltage
providing the first output voltage as a supply voltage to a first supply node of the die;
generating at a terminal of a first inductor a first die output voltage based on the supply voltage;
generating at a terminal of a second inductor a second die output voltage based on the supply voltage, the first die output voltage having a first voltage value different from a second voltage value of the second die output voltage; and
controlling the first die output voltage based on a feedback information of the first die output voltage.

20. The method of claim 19 further comprising:
controlling the second die output voltage based on an additional feedback information of the second die output voltage.

21. The method of claim 19, wherein the first output voltage is generated at a terminal of an additional inductor.

22. The method of claim 19, wherein the first output voltage is greater than the first die output voltage.

23. An apparatus comprising:
a die including:
    a first sense node to receive a first sense voltage related to a first output voltage at a first output node of an output circuit;
    a second sense node to receive a second sense voltage related to a second output voltage at a second output node of the output circuit;
    a first supply node to receive one of the first and second output voltages;
    a first die output node to provide a first die output voltage having a first voltage value;
    a second die output node to provide a second die output voltage having a second voltage value different from the first voltage value; and
    an output control circuit located on the die to interact with the output circuit and responsive to the first sense voltage to convert a source voltage at a source node into the first output voltage at the first output node of the output circuit, and the output control circuit to interact with the output circuit and responsive to the second sense voltage to convert the source voltage into the second output voltage at the second output node of the output circuit, the die further including a node to receive a voltage different from the source voltage to provide an initial voltage to the output control circuit; and
    a first output unit to convert a voltage at the first supply node into the first die output voltage at the first die output node; and
    a second output unit to convert the voltage at the first supply node into the second die output voltage at the second die output node.

24. The apparatus of claim 23, wherein the first output unit includes:
    a first transistor coupled between the first supply node and a first switch node;
    a first inductor coupled between the first switch node and the first die output node; and
    a first capacitor coupled between the first die output node and a second supply node.

25. The apparatus of claim 24, wherein the second output unit includes:
    a second transistor coupled between the first supply node and a second switch node;
    a second inductor coupled between the second switch node and the second die output node; and
    a second capacitor coupled between the second die output node and the second supply node.

26. The apparatus of claim 23, wherein the output control circuit includes:
    a first drive unit on the die to directly couple to a first gate of a first transistor of the output circuit; and
    a second drive unit on the die to directly couple to a second gate of a second transistor of the output circuit.

27. The apparatus of claim 26, wherein the output circuit further includes:
    a third transistor coupled in series with the first transistor between the source node and a second supply node;
    a first inductor coupled between the first output node and a node between the first and third transistors; and
    a first capacitor coupled between the first output node and the second supply node.

28. The apparatus of claim 27, wherein the output circuit further includes:
    a fourth transistor coupled in series with the second transistor between the source node and the second supply node;
    a second inductor coupled between the second output node and a node between the second and fourth transistors; and
    a second capacitor coupled between the second output node and the second supply node.

29. The apparatus of claim 23, wherein the first output voltage at the first output node has a value different from a value of the second output voltage at the second output node.

30. The apparatus of claim 29, wherein the value of each of the first and second output voltages is greater than each of the first and second voltage values of the first and second die output voltages.

31. The apparatus of claim 1, wherein the voltage received at the node and the source voltage are from a same power source.

* * * * *